United States Patent [19]

de Gennes

[11] 4,084,674

[45] Apr. 18, 1978

[54] DIAPHRAGM CLUTCH ASSEMBLY

[75] Inventor: Gerard de Gennes, Senlis, France

[73] Assignee: Societe Anonyme Francaise du Ferodo, Paris, France

[21] Appl. No.: 671,551

[22] Filed: Mar. 29, 1976

[30] Foreign Application Priority Data

Mar. 27, 1975 France .............................. 75 09588
Feb. 27, 1976 France .............................. 76 05485

[51] Int. Cl.² ............................................ F16D 13/44
[52] U.S. Cl. ................................................. 192/89 B
[58] Field of Search ....................................... 192/89 B

[56] References Cited

U.S. PATENT DOCUMENTS 3,283,864 11/1966 Motsch ............................... 192/89 B
3,811,544 5/1974 Maucher ............................ 192/89 B

FOREIGN PATENT DOCUMENTS 756,351 2/1952 Germany ........................... 192/89 B Primary Examiner—Benjamin W. Wyche
Attorney, Agent, or Firm—Diller, Brown, Ramik & Wight

[57] ABSTRACT

A sub-assembly for a diaphragm clutch comprises a clutch cover, a diaphragm, and connecting means rockably fastening the diaphragm to the cover with the interposition of a supporting washer. The connecting means comprise flat, relatively thin claws which extend from the front face of the cover through openings in the diaphragm and which are provided at the end of their axial portion with a wing portion which is bent over to retain the supporting washer; the entire supporting washer is disposed radially outside the diameter on which the axially extending portion of the claws lie.

16 Claims, 22 Drawing Figures

FIG. 4
FIG. 5
FIG. 6
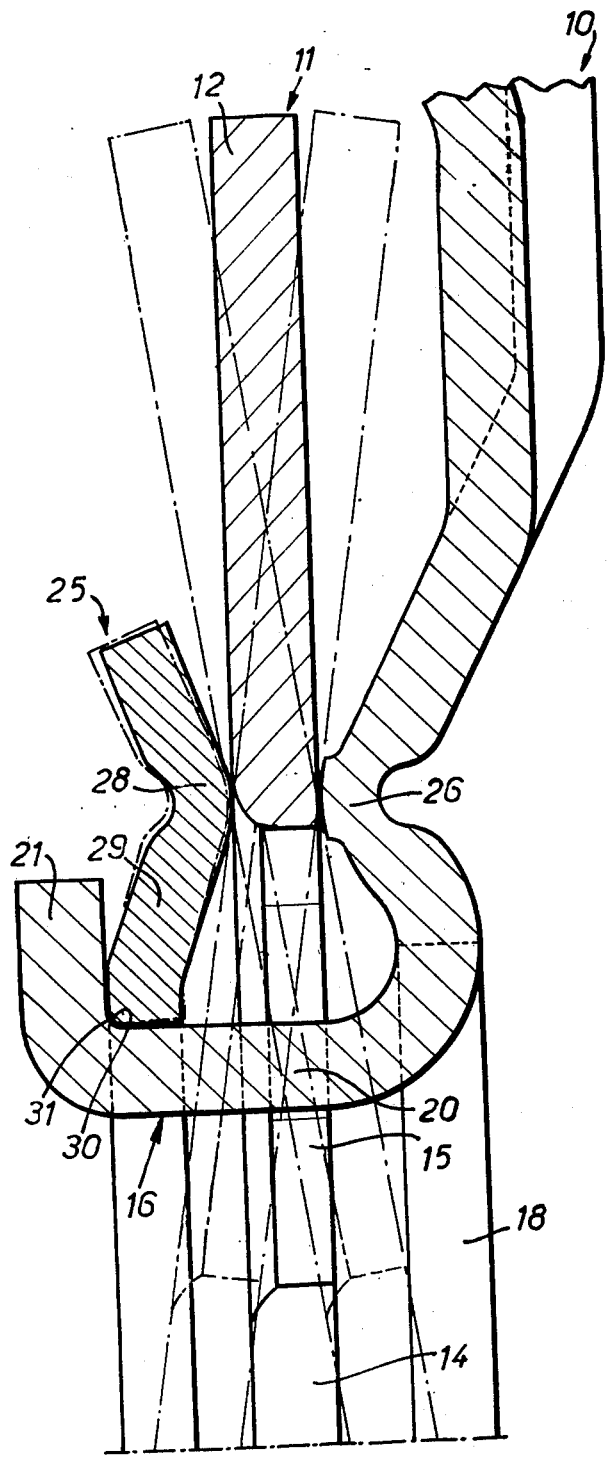
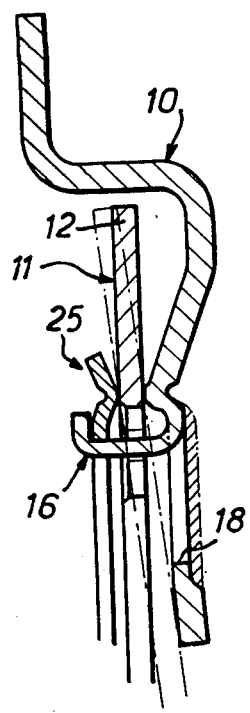
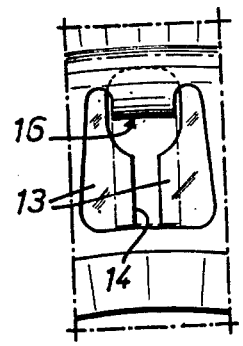

FIG.7 FIG.8 FIG.10
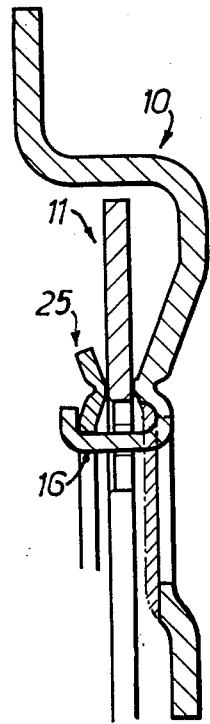
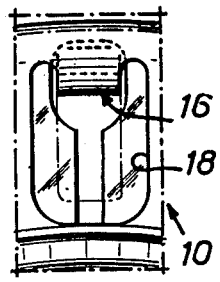
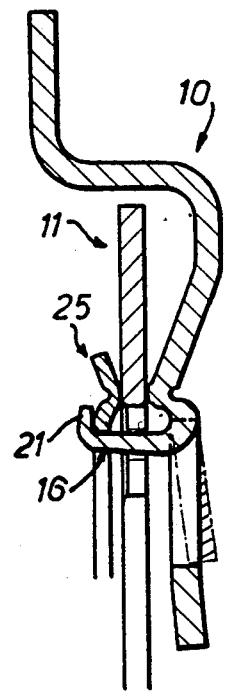
FIG.9
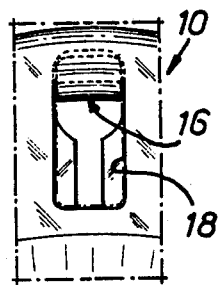
FIG.11 FIG.12 FIG.13
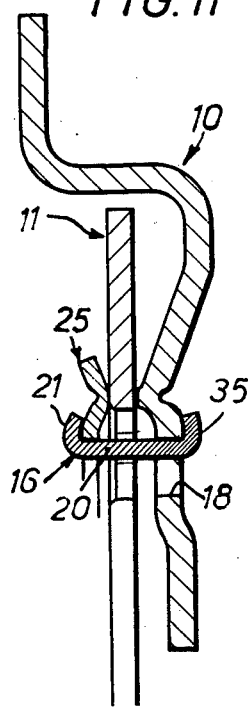
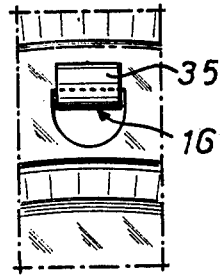
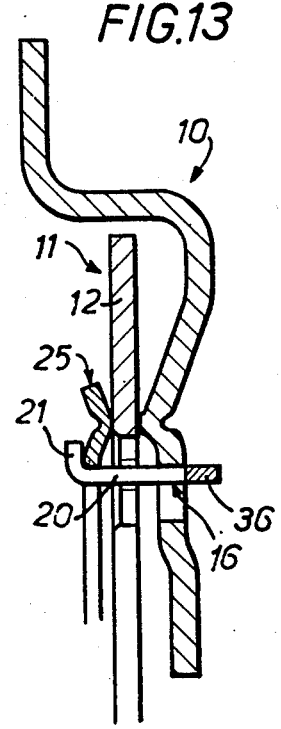
FIG.14
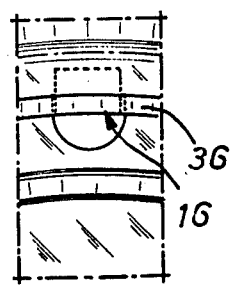

DIAPHRAGM CLUTCH ASSEMBLY

BACKGROUND OF THE INVENTION

This invention relates to clutches, especially for automobile vehicles. More particularly, the invention relates to diaphragm clutches which comprise a reaction plate adapted to be rigidly fastened to a first shaft which is generally a driving shaft, a friction disc mounted for axial movement in relation to the reaction plate and adapted to be rotationally fixed to a second shaft which is generally the driven shaft, a pressure plate mounted for axial movement in relation to the reaction plate, a generally annular cover adapted to be fixed by its outer periphery to the reaction plate and to be rotationally fixed to the pressure plate, a generally annular diaphragm having a peripheral portion forming an elastic washer of the Belleville washer type for acting on the pressure plate, and a central portion divided into radial fingers for engagement with a movable control element known as the clutch release bearing, and connection means pivotally fastening the diaphragm to the cover, the connection means extending through passages provided in the diaphragm between the radial fingers thereof in the zone in which these fingers are connected to the peripheral portion forming the elastic washer of the diaphragm.

In the construction of clutches of this kind, it is customary to build separately a first sub-assembly composed of the cover and the diaphragm carried by the cover, and a second sub-assembly composed of the pressure plate and fasteners adapted to connect the pressure plate to the cover; these sub-assemblies are then joined together, and the complete unit is then mounted on the reaction plate after insertion of the friction disc.

The present invention relates in particular to the first of these sub-assemblies, that is the assembly formed by the clutch cover and the diaphragm carried by it, but it also relates generally to diaphragm clutches, whether constructed by joining together two preassembled sub-assemblies or by the sequential assembly of its various component parts.

It has already been proposed to interpose a supporting washer between the diaphragm and the connecting means which pivotally fasten it to the cover, these connecting means bearing against the supporting washer on a circumference of a diameter smaller than that of the circumference on which the supporting washer bears against the diaphragm.

This arrangement has the effect that in the connecting means fastening the diaphragm to the cover a lever action is introduced between the support of these connecting means on the cover and their support on the diaphragm.

However, in arrangements of this type known up to the present time the supporting washer extends radially both inwardly and outwardly beyond the connecting means which apply it against the diaphragm, so that these connecting means must pass through passages provided for the purpose in the supporting washer.

Wheter these connecting means are composed of generally cylindrical pillars or of relatively flat, thin claws, this gives rise in all cases to a certain complexity during assembly, because of the accurate positioning required when the supporting washer is installed, in order to align and engage its passages with the connecting means.

Furthermore, these connecting means do not in themselves have any capacity for axial elasticity, and consequently, as the wear of the diaphragm and of the supports between which it is mounted for pivoting progresses, an increasing amount of play occurs between the diaphragm and these supports.

This play gives rise to a number of disadvantages.

Firstly, it may be the cause of noise. Secondly, during declutching it has the result of introducing a time lag between the moment when the clutch release bearing acts on the radial fingers of the diaphragm and the moment when the peripheral portion of the diaphragm releases the reaction plate.

Finally, the most serious disadvantage is that the play results in a shortening of the possible withdrawal stroke of the pressure plate, so that a declutching operation may be incomplete and the synchronising elements in the associated gearbox may be damaged; in addition, increased wear of the friction disc which is normally urged by this pressure plate against the associated reaction plate occurs.

In order to eliminate certain of these disadvantages, it has already been proposed to provide the supporting washer interposed between the diaphragm and the connecting means with a certain amount of axial elasticity.

However, in constructions of this type proposed hitherto, this supporting washer has in practice a load substantially smaller than the declutching load, that is to say the load of the diaphragm at the position of the clutch release bearing.

Consequently, although this axial elasticity of the supporting washer, which is generally provided in order to attempt to obtain progressivity in the reengagement of the clutch, can actually enable the diaphragm to be held in the clutch engagement position without play, and therefore makes it possible to eliminate the noise which may normally be caused as the result of the wear inevitably occurring between the diaphragm and its supports, it cannot in any circumstances prevent the time lag in the declutching operation and the reduction of the possible withdrawal stroke of the pressure plate due to this wear, but on the contrary only increases them.

It has in addition been proposed to provide the connecting means fastening the diaphragm to the cover with some axial elasticity by applying during installation of these connecting means a preliminary stress having a higher load than that of the diaphragm at the position of the clutch release bearing.

However, in constructions of this type proposed up to the present time these connecting means bear directly on the diaphragm, without the interposition of a supporting washer.

It is an object of the invention to minimise or eliminate the various disadvantages briefly explained above and to provide an assembly which complies in a simple, advantageous manner with the requirements which have to be met for the easy installation and for reliable and quiet operation over an extended period of time of an assembly of this kind.

SUMMARY

According to the present invention, there is provided an assembly for a diaphragm clutch comprising a generally annular cover element adapted for connection to a reaction plate and being capable of being fixed for rotation with a pressure plate, a generally annular diaphragm having a peripheral portion forming an elastic washer of the Belleville washer type adapted to act on the pressure plate, and a central portion divided into radial fingers for operation by a clutch release bearing, connecting means pivotally fastening the diaphragm to the cover element which connecting means pass through passages formed in the said diaphragm between the radial fingers thereof in the zone in which these fingers are connected to the peripheral portion of the diaphragm, and a supporting washer interposed between the connecting means and the said diaphragm, the connecting means bearing on the supporting washer on a circumference of a diameter which is smaller than that of the circumference on which the supporting washer bears on the peripheral portion of the diaphragm, the connecting means comprising at least one flat and relatively thin connecting claw which extends at one end from the cover and which has a generally axial portion passing through one of the passages in the diaphragm and a radially folded wing portion at the opposite end thereof retaining the supporting washer in contact with the peripheral portion of the diaphragm, the entire supporting washer being disposed radially beyond the diameter on which the axial portion of the claw is located.

As the result of this arrangement, the supporting washer can be located in position very easily during assembly, this supporting washer being centred by the edge of its inner periphery on the connecting claws on which it is engaged.

Furthermore, since this supporting washer has no inward radial extension, it uses less metal than the case where such a radial extension is provided, while in addition the actual shape of the supporting washer permits a construction of smaller diameter.

Furthermore, according to a development of the invention it is possible to impart an initial stress to the supporting washer during installation by means of the connecting claw which fastens it to the cover, and this initial stress is selected so that the load resulting therefrom between the supporting washer and the diaphragm will always be greater than that of the diaphragm at the position of the clutch release bearing, throughout the life of the assembly, without this load attaining, on installation, an excessive value which would increase internal friction to an intolerable extent.

Thus this supporting washer is able to provide permanent elastic support for the diaphragm on any undue time lag resulting in a declutching operation.

Furthermore, it is then possible to give the connecting means used all the desirable axial rigidity, this axial rigidity being particularly favourable in relation to the rocking of the diaphragm during operation, taking into account the fact that the lever action of the supporting washer can serve this purpose all the more effectively because the supporting washer itself has some axial elasticity.

In this respect, the axial portion of a connecting claw of the connecting means used in the assembly of the invention preferably forms a corner zone, for example a right-angle corner at the junction of the free end wing portion; at this corner zone, the supporting washer is mounted for pivoting by its inner periphery, the axial edge of this inner periphery which is at a greater distance from the diaphragm being in contact with the said corner zone.

This results in a particularly well defined pivoting movement of the supporting washer during a declutching operation, which is favourable for the rocking of the diaphragm.

In various embodiments the connecting claws of the connecting means fastening the diaphragm to the cover form parts which are independent of one another or are connected in pairs or groups by a common bar member which extends circumferentially and which bears against the face of the cover remote from the diaphragm.

Nevertheless, in a preferred embodiment these connecting claws originate in known manner from the cover itself and are integral with it.

An arrangement of this kind is relatively easy to apply to clutches intended for light vehicles, because the sheets from which the covers of such clutches are drawn have only relatively small thicknesses such as will permit without great difficulty the cutting out and folding necessary for the formation of the connecting claws.

This is not the case where the clutches in question are intended for heavy vehicles, since the sheet from which the cover is made must then have relatively substantial thickness.

In order to avoid this difficulty, the present invention proposes to form the connecting claws in question from a part of the cover having a reduced thickness.

In this connection the present invention also includes a process suitable for producing a cover having claws of reduced thickness for an assembly for a diaphragm clutch, in which a cover is formed by drawing a metal sheet of constant thickness, and the zone of this cover in which the claws are subsequently to be formed by cutting out and folding, and which is generally the zone near its inner periphery, is reduced in thickness by machining prior to the formation of the claws.

There is in addition the problem of effecting the correct folding of the connecting claws which is necessary for the terminal support of these claws on the supporting washer.

A further aspect of the present invention has a particularly simple and effective solution to this problem.

According to a further embodiment of the invention, a groove is formed in the folding zone of the connection claws in order to form the fold line along which the claws are to be folded.

A fold line of this kind has in particular the advantage of locating accurately and in a strictly controlled manner the zone in which the subsequent corresponding folding of the claw in question will be effected, which is particularly advantageous when the connecting means to which this claw belongs have to apply a determined preliminary stress to the supporting washer, applying the latter against the diaphragm, as mentioned above.

It also provides the advantage of facilitating the folding of the claw concerned, which is important in some cases in which the coacting part taking the corresponding axial folding force, which in practice is the supporting washer, does not always possess enough axial strength necessary for this folding operation to be effected safely and effectively.

In addition, it also makes it possible to use a thicker sheet for producing these connection means and any additional integral element as may be required for example, with clutches intended for heavy vehicles.

The groove constituting this fold line is preferably formed before cutting out the claw in question, projecting laterally from the intended shape of the claw, so that on the one hand this shape is not affected by the production of this groove and on the other hand the burrs resulting from the cutting-out of the claw will at least partly transversely close the ends of the groove and thus locally re-establish the outer peripheral surface of the claw on which the diaphragm engages on assembly; as a result, in the course of this assembly the diaphragm will not accidentally catch in the grooves.

Finally, the present invention also includes a diaphragm clutch, particularly for automobile vehicles, whenever including an assembly as hereinbefore described.

BRIEF DESCRIPTION OF THE DRAWINGS

FIG. 4 is a similar view to FIG. 1, illustrating the functioning of the assembly;

FIGS. 5 and 6 are respectively views similar to those in FIGS. 1 and 2 and relate to a modified embodiment;

FIGS. 7 and 8 are likewise views respectively similar to those of FIGS. 1 and 2 and relate to another modified embodiment;

FIG. 9 is a similar view to that in FIG. 8 and relates to another modified embodiment;

FIG. 10 is a similar view to that in FIG. 1 and relates to another modified embodiment;

FIG. 11 and 12 on the one hand, and 13 and 14 on the other hand, are views respectively similar to those of FIGS. 1 and 2 and relate to other modified embodiments;

DESCRIPTION OF THE PREFERRED EMBODIMENTS

Figure 1:
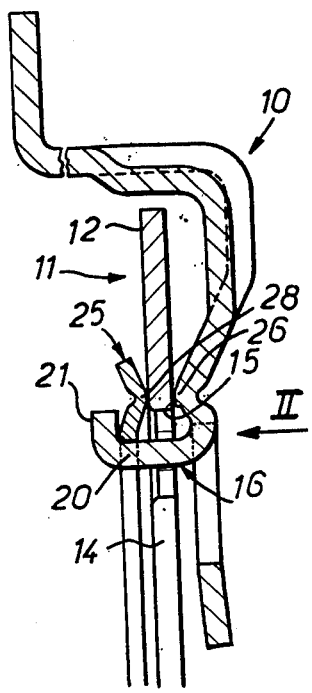
FIG. 1 is a partial view in axial section of an assembly for a diaphragm clutch.

As illustrated in these drawings the assembly for a diaphragm clutch generally comprises a generally annular cover 10 and a generally annular diaphragm 11. In known manner, the cover 10 is provided on its periphery with a first series of co-planar areas by which it is adapted to be fixed to a reaction plate (not shown), and a second series of co-planar areas which are axially displaced in relation to the first series and by which the cover can be fastened by tongues to a pressure plate (likewise not shown).

The diaphragm 11 has a peripheral portion 12 which forms an elastic washer of the Belleville washer type, and by means of this peripheral portion it is in contact with the pressure plate.

The tongues rotationally fastening this pressure plate to the cover 10 permit the pressure plate sufficient axial mobility to enable it, through the action of the diaphragm 11, to clamp against the associated pressure plate a friction disc interposed between these plates and adapted to move axially in relation to them.

These arrangements are well known in themselves and will not be described in any further detail.

The diaphragm 11 has in addition a central portion divided into radial fingers 13 separated in pairs by slits 14 extending from passages 15 provided between these radial fingers 13 in the zone in which they are connected to the peripheral portion 12 of the diaphragm 11 which forms the Belleville washer.

A clutch release bearing (not shown) is adapted to act on the free ends of these radial fingers 13.

Connecting means are in addition provided for pivotally fastening the diaphragm 11 to the cover 10.

In the example shown in FIGS. 1 to 4 these connecting means comprise a plurality of connecting claws 16 which are relatively flat and thin and which are formed directly from the cover 10 by a suitable cutting-out and folding operation.

Figure 2:
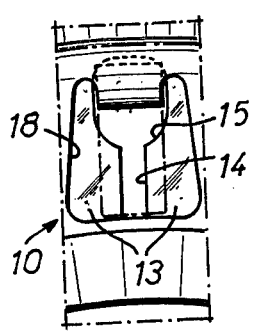
FIG. 2 is a partial front view of an assembly of this kind, viewed in the direction of the arrow II in FIG. 1.

In the example shown in FIGS. 1 to 4, windows 18 are provided for this purpose by cutting through the central zone of the cover 10 near its inner periphery, and these windows have an overall shape which is considerably larger than the original shape, shown diagrammatically by dashed lines in FIG. 2, of the connecting claws 16 which are formed from the cut-out portions, with the exception of the end radial edge of these connecting claws 16, which coincides substantially with the corresponding edge of the windows 18.

To achieve this, in this embodiment, the connecting claws 16 have to be reduced in size by cutting off the side flanks and the radial ends of the claws.

After folding, a connecting claw 16 of this kind has, beyond a generally axial portion 20 which is radially thin and circumferentially elongated and which passes through one of the passages 15 of the diaphragm 11, an end wing 21 directed radially away from the axis of the assembly.

The diaphragm 11 bears against the cover 10 by one of the faces of its peripheral portion 12, and bears by its other face of the said peripheral portion against a supporting washer 25 interposed between the diaphragm 11 and the connecting claws 16 fastening it pivotally to the cover 10.

Figure 3:
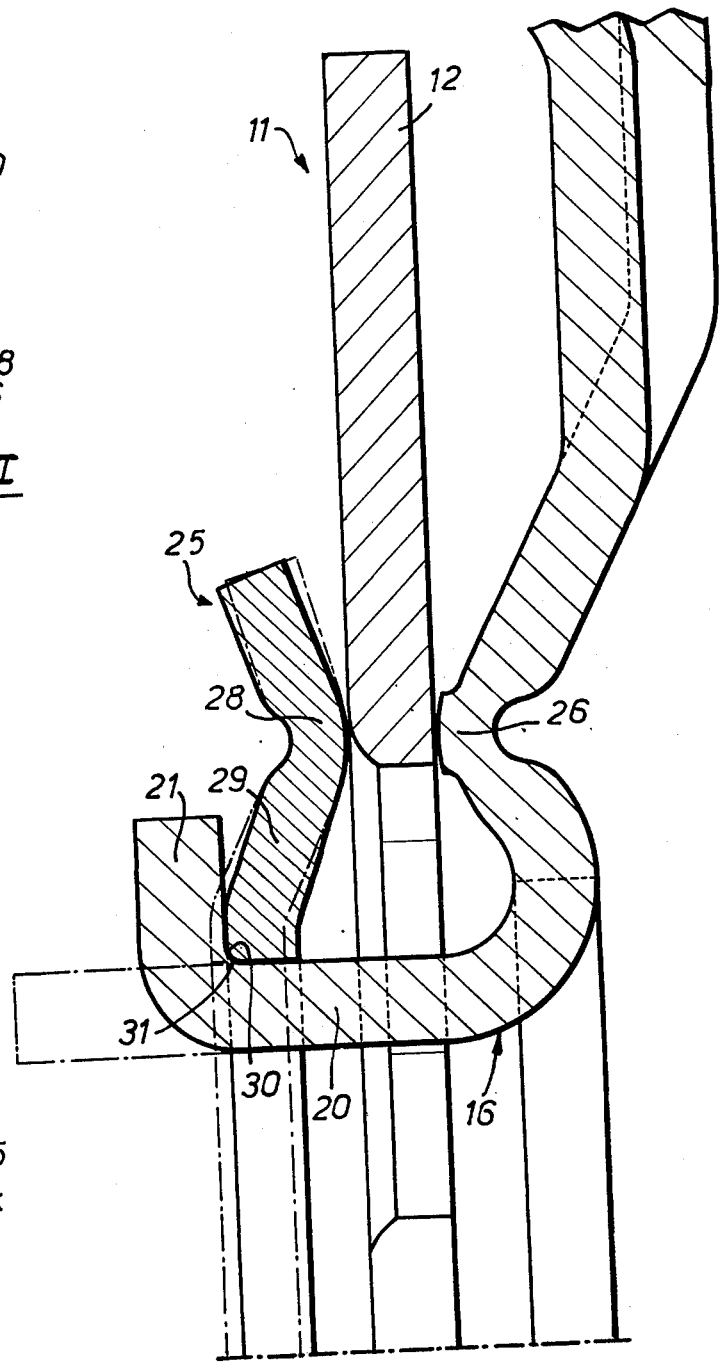
FIG. 3 shows on a larger scale a detail of FIG. 1, illustrating the building up of this assembly.
Figure 15:
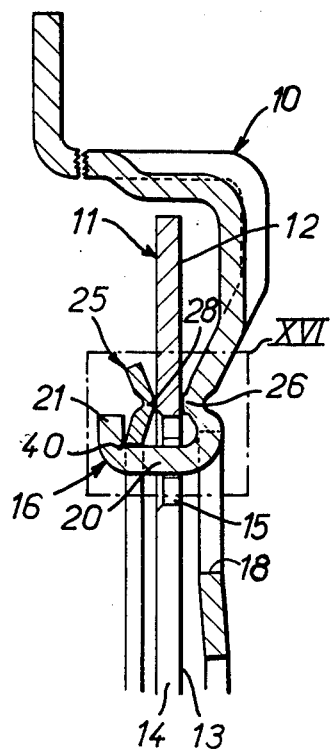
FIG. 15 is a partial view in axial section of an assembly for a diaphragm clutch in another modified embodiment.
Figure 16:
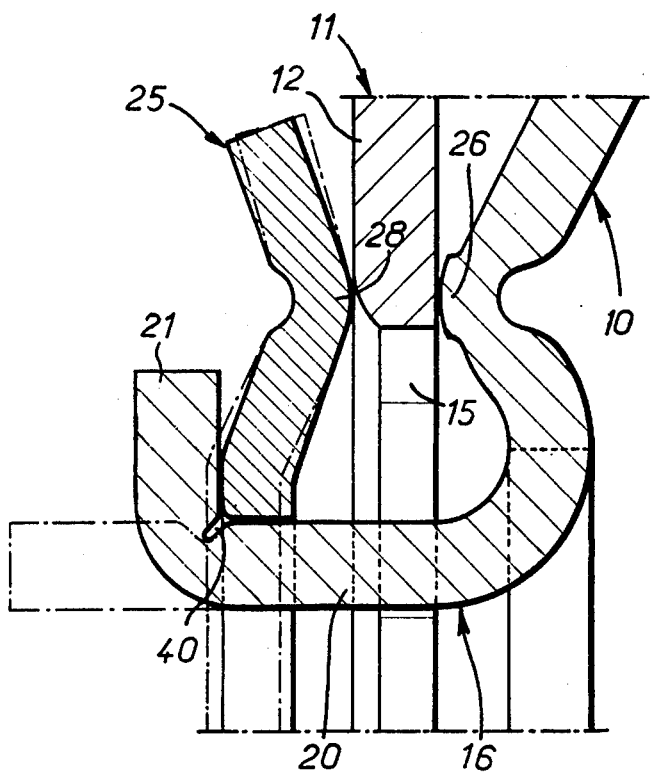
FIG. 16 shows on a larger scale a detail of FIG. 1 corresponding to the box XVI in the said FIG. 1.
Figure 18:
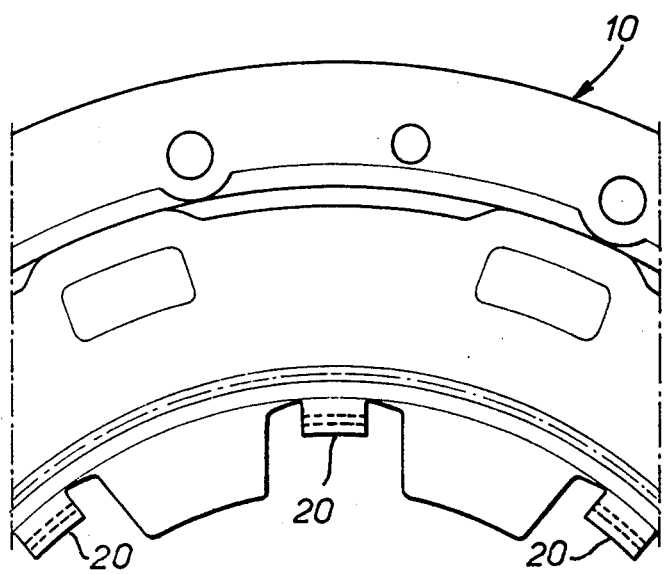
FIGS. 18 and 19 are partial views in elevation of this cover respectively in the directions of the arrows XVIII and XIX in FIG. 17.
Figure 17:
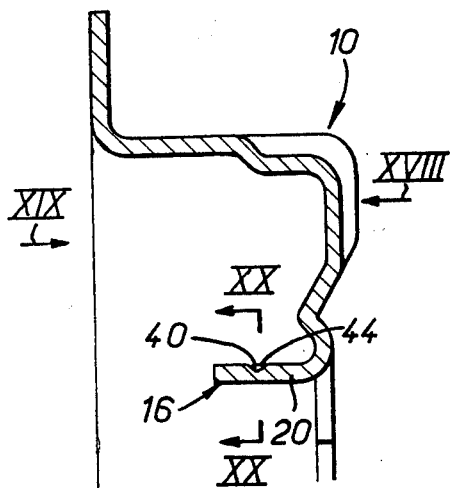
FIG. 17 shows on a different scale a partial view in axial section of the cover of an assembly of this kind before a diaphragm is fastened to it.

In practice, as illustrated in FIG. 3, the cover 10 is provided with an annular bead 26, formed by a simple drawings operation for supporting the peripheral portion 12 of the diaphragm 11.

In addition, the supporting washer 25 has in crosssection the shape of a very open V, this supporting washer 25 being in contact with the peripheral portion 12 of the diaphragm 11 by means of the convex portion of its curved median zone 28.

As will readily be understood, the radially innermost portion 29 of the supporting washer 25, that is to say the portion of this supporting washer which extends radially beyond its curved median zone 28 towards the axis of the assembly, forms a Belleville washer.

It is by this portion 29 that the supporting washer 25 is held by the connecting claws 16 in contact with the peripheral portion 12 of the diaphragm 11, and it will be noted that the entire supporting washer 25 is disposed radially beyond the diameter on which the axial portion 20 of the connecting claws 16 is located.

In practice, the axial portion 20 of a connecting claw 16 forms with its end wing 21 a corner zone 30 which is generally right-angled in the example illustrated in FIGS. 1 to 4, and in which the supporting washer 25 is mounted for pivoting by the inner periphery of its radially innermost portion 29, the axial edge 31 of this inner periphery remote from the diaphragm 11 being in contact with the corner zone 30.

For the installation of the assembly, the end wings 21 of the connecting claws 16 form axial extensions of the axial portion 20 of these claws, as indicated diagrammatically by chain-dotted lines in FIG. 3, so that the supporting washer 25 can be placed in position very easily, and centered by its inner periphery on the axial portion 20 of the connecting claws 16.

The end wings 21 of the connecting claws 16 are then folded over at right angles, as shown in solid lines in FIG. 3, and according to a development of the invention this folding-over at right angles is effected at such an axial level in relation to the diaphragm 11 that the supporting washer 25, or more precisely the radially innermost portion thereof which forms a Belleville washer 29, is subjected to prestressing; the prestressed position which the washer 25 adopts after assembly is shown in solid lines in FIG. 3, the unstressed initial position being diagrammatically indicated in broken lines in FIG. 3.

This prestressing is so selected as to provide a higher load than that of the diaphragm 11 at the point of contact of the clutch release bearing associated with it, under the conditions indicated above.

Thus during operation, and as diagrammatically indicated in chain-dotted lines in FIG. 4, through its pivoting in the corner zone 30 of the connecting claws 16, the supporting washer 25 permits the rocking of the diaphragm 11 which is necessary for its operation, without the axial elasticity which it possesses bringing about any time lag in the declutching operation.

This axial elasticity intervenes in fact only to hold the diaphragm 11 permanently supported without play between the cover 10 and the supporting washer 25.

In the example illustrated in FIGS. 1 to 4 the connecting claws 20 have the same thickness as the remainder of the cover 10 from which they are formed.

In the modified embodiment shown in FIGS. 5 and 6 the portion of the cover 10 from which these connecting claws 16 are formed is of reduced thickness, thus facilitating the cutting-out and folding of these connecting claws.

As indicated diagrammatically by hatching in FIG. 5, the reduced thickness of the zone from which the claws are formed is achieved by machining this zone prior to the formation of the connecting claws 16.

In FIG. 5 this reduction of thickness applies to the opposite face of the cover to that which contacts the diaphragm 11.

As an alternative shown in FIGS. 7 and 8, this reduction in thickness applies to the face of the cover 10 which is adjacent the diaphragm 11. In addition, in this alternative, the connecting claws 16 are formed by cutting-out an opening all around them, without any additional cutting-off.

On the other hand, in the alternative illustrated in FIG. 9 the claws are formed without the removal of additional metal.

To enable these arrangements to be more readily understood, the outline of the connecting claws 16 before folding is shown in dashed lines in FIGS. 8 and 9, as in FIG. 2.

In the alternative embodiment illustrated in FIG. 10, the thickness of the connecting claws 16 tapers in the direction of their end wing 21.

As diagrammatically illustrated by dashed lines and hatching in FIG. 10, this arrangement may be obtained by bending in the opposite direction the portions of the cover 10 each of which is to form a connecting claw 16 through a small angle before the folding of the claws, and machining away the portion of the parts which project beyond the remainder of the cover.

In the foregoing embodiments, the connecting claws 16 are formed from the cover 10 and are integral with it.

In the modified embodiment illustrated in FIGS. 11 and 12, these connecting claws 16 are separate parts which are independent of one another and which are circularly distributed.

In addition to the end wing 21 by which a connecting claw 16 of this kind holds the supporting washer 25 in contact with the diaphragm 11, each connecting claw 16 is provided at the other end of its axial portion 20 with an end wing 35 by which it is individually supported against the cover 10 on the opposite face to that which contacts the diaphragm 11.

In the modified embodiment illustrated in FIGS. 13 and 14, at least some of these individual connecting claws 16 are connected to one another by a common bar 36 which extends circumferentially in place of their end wings 35 and which is supported against the cover 10.

A bar 36 of this kind may be circularly continuous, the connecting claws 16 then belonging to a single connecting washer.

In the modified embodiments shown in FIGS. 15 to 22, each of the connecting claws 16 is provided in its fold zone with a transverse groove 40 which opens in the direction of the supporting washer 25 and which constitutes the fold line of the claw.

As will easily be understood, this groove 40, which is formed in each claw 16 as a wide V-section groove before the folding of the claw (FIG. 17) and whose flanks are substantially parallel to one another after the folding (FIGS. 15 and 16), is of such a nature as to facilitate the folding of the claw in question and to accurately locate the zone in which the folding will be effected. The groove 40 is in fact preferably formed in the material of the connection claws 16 before the claws are cut out from the blank.

Figure 19:
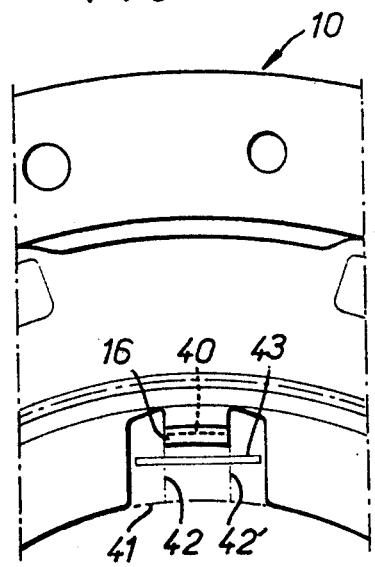

In the case of claws which are integral with the cover 10, this arrangement is illustrated in FIG. 19, in which the substantially circular arc-shaped broken line 41 represents the inner periphery of the cover blank before the claws 16 are cut out, while the substantially radial broken lines 42, 42' represent the lateral edges of the intended contour of a claw 16.

The cover blank 10 is provided with a groove extending transversely in relation to the intended contour of each claw 16, spaced from the end of the claw, and for preference, as illustrated in FIG. 19, this groove is arranged to project laterally beyond the lateral edges 42, 42' of the intended shape of the claw 16.

In FIG. 19 an elongated rectangle 43 indicates the groove in question, and this groove can for example be formed by deep drawing or press coining of the cover blank 10.

After this deep drawing or coining, each claw 16 is formed in the cover blank 10, for example by cutting through the latter or by stamping in a press. The claws are then folded at right angles parallel to the axis of the cover 10 thus formed.

As will readily be understood, the fact that the deep drawing or coining resulting in the formation of the grooves 40 is effected even before the claws are cut out makes it possible to ensure that the dimensional characteristics of these claws will not be modified by any distortion inherent in such deep drawing or coining.

Figure 20:
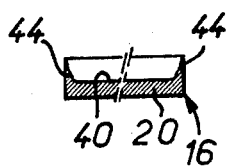
FIG. 20 is a partial view on a larger scale, in section on the line XX—XX in FIG. 17.

Furthermore, the stamping out in a press or the cutting which is then necessary for the formation of the claws 16 generally leads to the presence of burrs which at least partly close the grooves transversely at their ends, as can be seen at 44, 44′ in FIG. 20.

These burrs, resulting from the cutting-out or cutting-off operation, are not in themselves a hindrance, but on the contrary they advantageously restore locally the outer peripheral surface of the claws 16 on which the diaphragm 11 and the supporting washer 25 are engaged, thus making it impossible, when this engagement is effected, for these parts to be accidentally caught in the grooves 40.

Figure 22:
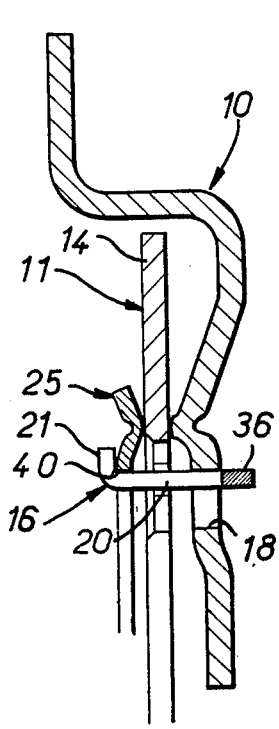
FIGS. 21 and 22 are partial views similar to that in FIG. 15, each relating respectively to a modified embodiment.
Figure 21:
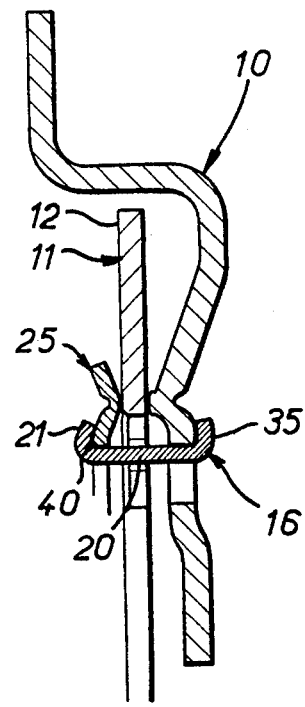

In the modified embodiments illustrated in FIGS. 21 and 22 the connection means pivotally fastening the diaphragm 11 to the cover 10 are composed of one or more parts which are separate from the cover 10, as in FIGS. 11 and 13 respectively.

As previously, the end wings 21 of the corresponding connection claws 16, which are folded over into contact with the supporting washer 25, are provided transversely with a groove 40.

As will be seen, the transverse grooves 40 according to the invention are in practice "open" in the direction of the diaphragm 11, that is to say their concavity faces the diaphragm.

The present invention is not limited to the embodiments and constructions described and illustrated, but includes any alternative arrangement within the scope of the appended claims.

In particular, in the embodiments illustrated in FIGS. 1 to 10, in which the connection claws 16 are integral with the cover 10, no transverse groove is provided in the fold zone of these claws at the point where the claws join the remainder of the cover; this is because the corresponding folding can be effected in a strictly controlled manner, since this folding is applied only to the claws themselves (the same is not true in the case of the folding of the end wings of these claws, which must be folded into contact with the supporting washer 25 and which is more difficult to effect accurately, bearing in mind the fact that, as mentioned above, it is this supporting washer 25 which then constitutes the coacting part necessary for this folding). Nevertheless, if desired, the connection claws 10 may also have a transverse groove in their folding zone remote from their end wing 21.

The same applies to the embodiments shown in FIGS. 11 and 21.

Furthermore, when the connection claws are formed from the cover, they can be cut out from the free edge of the inner periphery thereof.

I claim:

1. An assembly for a diaphragm clutch, comprising a generally annular cover element adapted for connection to a reaction plate and being capable of being fixed for rotation with a pressure plate, a generally annular diaphragm having a peripheral portion forming an elastic washer of the Belleville washer type adapted to act on said pressure plate, and a central portion divided into radial fingers for operation by a clutch release bearing, connecting means pivotally fastening said diaphragm to said cover element which connecting means pass through passages formed in said diaphragm between the radial fingers thereof in the zone in which these fingers are connected to the peripheral portion of the diaphragm and a supporting washer interposed between said connecting means and said diaphragm, the connecting means bearing on the supporting washer on a circumference of a diameter which is smaller than that of the circumference on which said supporting washer bears on said peripheral portion of the diaphragm, and said connecting means comprising at least one flat and relatively thin connecting claw which extends at one end from the cover and which has a generally axial portion passing through one of the passages in the diaphragm and a radially folded wing portion at the opposite end thereof retaining the supporting washer in contact with the peripheral portion of said diaphragm, the axial portion of said at least one connecting claw forming with its wing portion a corner zone in which the supporting washer is pivotally mounted at its inner periphery, the axial edge of this inner periphery being situated at the greater distance from the diaphragm being in contact with said corner zone of the connecting claw, the entire supporting washer being disposed radially beyond the diameter on which the axial portion of said at least one claw is located.

2. An assembly according to claim 1, wherein the corner zone of said at least one connecting claw is generally right-angled.

3. An assembly according to claim 1, wherein the relationship of the components of the assembly is such that on installation of said assembly in combination with a reaction plate and a clutch release bearing, said supporting washer stressed by said at least one connecting claw connecting it to the cover to a load higher than that of the diaphragm at the point where the diaphragm engages the clutch release bearing.

4. An assembly according to claim 1, wherein said connecting means fastening the diaphragm to the cover comprise a plurality of circularly distributed connecting claws.

5. An assembly according to claim 4, wherein said connecting claws are separate from each other and are each operatively connected to the cover by a wing portion supported against the cover on the face of the cover remote from said diaphragm.

6. An assembly according to claim 4, wherein at least some of said connecting claws are connected to one another by a common bar member which extends circumferentially and which is supported against the face of the cover remote from said diaphragm.

7. An assembly according to claim 6, wherein the bar member is circularly continuous, and said connecting claws belong to a single connecting washer.

8. An assembly according to claim 4, wherein at least some of said connecting claws are formed from the cover and are integral therewith.

9. As assembly according to claim 8, wherein said at least some claws are formed from a part of the cover which has a reduced thickness.

10. An assembly according to claim 9, wherein said connecting claws formed from said reduced thickness part of said cover taper in the direction of their free end wing portion.

11. The combination of a diaphragm clutch and an assembly therefore as claimed in claim 1.

12. An assembly according to claim 1 wherein said supporting washer is generally angular in radial cross section and is pivotally supported by said connecting means.

13. An assembly for a diaphragm clutch, comprising a generally annular cover element adapted for connection to a reaction plate and capable of being fixed for rotation with a pressure plate, a generally annular diaphragm member having a Belleville washer like peripheral portion adapted to act on said pressure plate, and a central portion divided into radial fingers for engagement by a clutch release bearing, connecting means rockably fastening said diaphragm member to said cover element, said connecting means passing through passages formed in said diaphragm member between the radial fingers thereof in a zone joining said fingers to said diaphragm peripheral portion, and a supporting washer interposed between said connecting means and said diaphragm member, the connecting means bearing axially against said supporting washer along a circumference radially inwardly of a circumference along which said supporting washer bears axially against said diaphragm peripheral portion, and said connecting means comprising at least one axially elongate sheet metal connecting claw which extends at one end from the cover and which has a generally axial portion passing through one of said passages in said diaphragm member and a radially outwardly folded wing portion at the opposite end thereof retaining said supporting washer in contact with the diaphragm peripheral portion, the entire supporting washer being disposed radially beyond the axial portion of said at least one claw, said supporting washer having in cross-section the shape of a very open V, and being in contact with the peripheral portion of the diaphragm by the convex portion of its curved median zone.

14. An assembly for a diaphragm clutch, comprising a generally annular cover element adapted for connection to a reaction plate and being capable of being fixed for rotation with a pressure plate, a generally annular diaphragm having a peripheral portion forming an elastic washer of the Belleville washer type adapted to act on said pressure plate, and a central portion divided into radial fingers for operation by a clutch release bearing, connecting means pivotally fastening said diaphragm to said cover element which connecting means pass through passages formed in said diaphragm between the radial fingers thereof in the zone in which these fingers are connected to the peripheral portion of the diaphragm, and a supporting washer interposed between said connecting means and said diaphragm, the connecting means bearing on the supporting washer on a circumference of a diameter which is smaller than that of the circumference on which said supporting washer bears on said peripheral portion of the diaphragm, and said connecting means comprising at least one flat and relatively thin connecting claw which extends at one end from the cover and which has a generally axial portion passing through one of the passages in the diaphragm and a radially folded wing portion at the opposite end thereof retaining the supporting washer in contact with the peripheral portion of said diaphragm, the entire supporting washer being disposed radially beyond the diameter on which the axial portion of said at least one claw is located, and in the folding zone each of said connecting claws being formed with a transverse groove which is open in the direction of the diaphragm and which constitutes the fold line.

15. An assembly according to claim 1, wherein at its ends, said groove is at least partially closed transversely by a burr resulting from a cutting-off or cutting-out operation.

16. An assembly for a diaphragm clutch, said assembly comprising a generally annular cover element having a portion for connection to a reaction plate and being capable of being fixed for rotation with a pressure plate, a generally annular diaphragm, said diaphragm having a peripheral portion forming an elastic washer for acting on an associated pressure plate and a central portion divided into radial fingers for operation by a clutch release bearing, connecting means fastening said diaphragm to said cover element for pivoting relative to said cover element, said cover element having pivot defining means for said diaphragm, said diaphragm having circumferentially spaced radial fingers connected to radial inner peripheral portions of said diaphragm, adjacent ones of said radial fingers defining passages in said diaphragm, said connecting means passing through said passages adjacent the connections of said radial fingers to the remainder of said diaphragm, and an annular axially compressive supporting washer interposed between said connecting means and said diaphragm, said supporting washer having first defining means for said diaphragm generally opposing said pivot defining means of said cover element, said connecting means bearing on said supporting washer on a circumference of a diameter which is smaller than that of the circumference on which said supporting washer and said cover element pivot defining means are disposed, and said connecting means comprising a plurality of circumferentially spaced flat and relatively thin connecting claws each of which extend at one end from the cover and which has a generally axial portion passing through one of the passages in the diaphragm and a radially folded wing portion at the opposite end thereof retaining the supporting washer in compressive contact with said diaphragm, the entire supporting washer being disposed radially beyond the diameter on which the axial portion of each claw is located, each claw having an interior corner defined by its axial portion and wing portion, and said supporting washer having a planar inner portion seated in said claw interior corners.

* * * * *